(12) United States Patent
Wang et al.

(10) Patent No.: US 11,555,510 B2
(45) Date of Patent: Jan. 17, 2023

(54) JOINING METHOD FOR FASTENING TOLERANCE ADJUSTERS TO MAGNESIUM-BASED CASTINGS

(71) Applicant: Magnesium Products of America Inc., Eaton Rapids, MI (US)

(72) Inventors: Gerry Gang Wang, London (CA); Paul Stuckless, Strathroy (CA)

(73) Assignee: MAGNESIUM PRODUCTS OF AMERICA, INC., Eaton Rapids, MI (US)

( * ) Notice: Subject to any disclaimer, the term of this patent is extended or adjusted under 35 U.S.C. 154(b) by 659 days.

(21) Appl. No.: 16/554,418

(22) Filed: Aug. 28, 2019

(65) Prior Publication Data

US 2020/0072263 A1 Mar. 5, 2020

Related U.S. Application Data

(60) Provisional application No. 62/724,402, filed on Aug. 29, 2018.

(51) Int. Cl.
*F16B 5/02* (2006.01)
*F16B 35/04* (2006.01)

(52) U.S. Cl.
CPC ............ *F16B 5/025* (2013.01); *F16B 35/042* (2013.01)

(58) Field of Classification Search
CPC .. F16B 5/0233; F16B 5/025; Y10T 29/49835; Y10T 29/49938
See application file for complete search history.

(56) References Cited

U.S. PATENT DOCUMENTS

| | | | |
|---|---|---|---|
| 3,451,583 A * | 6/1969 | Leighton | F16L 55/132 220/233 |
| 2004/0221980 A1 | 11/2004 | Sidener et al. | |
| 2005/0072548 A1 | 4/2005 | Murray et al. | |
| 2012/0258328 A1 * | 10/2012 | Carlson | B21J 15/025 29/432.1 |
| 2015/0056470 A1 | 2/2015 | Shunzo et al. | |

OTHER PUBLICATIONS

International Search Report and Written Opinion re Application No. PCT/US2019/048652; 10 pgs.

* cited by examiner

*Primary Examiner* — Jason L Vaughan
*Assistant Examiner* — Amanda Kreiling
(74) *Attorney, Agent, or Firm* — Foley & Lardner LLP

(57) ABSTRACT

An interference fit joining method includes providing a tolerance adjuster and a die casting boss formed in a magnesium-based die casting. The method also includes positioning the tolerance adjuster over a cavity of the die casting boss. The method also includes pressing the tolerance adjuster at least partially into the cavity to form a joint assembly.

20 Claims, 9 Drawing Sheets

JOINING METHOD FOR FASTENING TOLERANCE ADJUSTERS TO MAGNESIUM-BASED CASTINGS

CROSS-REFERENCE TO RELATED PATENT APPLICATION

This application claims the benefit of and priority to U.S. Provisional Patent Application No. 62/724,402, filed Aug. 29, 2018, the entire disclosure of which is incorporated herein by reference.

BACKGROUND

The present application relates to joining methods for fastening tolerance adjusters (also called tolerance compensators) onto magnesium-based die castings. More specifically, the present application relates to joining methods for fastening tolerance adjusters onto magnesium-based die castings using interference fitting measurements in automotive applications.

Tolerance adjusters are typically designed to bridge distances (i.e. tolerances) between two axially-connected components using an automatic, self-adjusting mechanism. In automotive applications, tolerance adjusters are often used as vital components in the assembly of, for example, headlamps, rear lights, instrument panels, mudguards, door frames and roof ledges. A conventional tolerance adjuster is illustrated in FIG. 1 and comprises a compensation (i.e. adjuster) element, which translates axially and includes horizontal flat surface as the connecting means, a spring element for enabling axial mobility of the compensation element, a base element into which the compensation element is screwed to adjust tolerances, and a tang-style fastening element for attaching onto magnesium-based die casting bosses. The magnesium-based die casting bosses serve as a mounting point for the tolerance adjuster and must be designed to have sufficient structural integrity and strength for supporting the tolerance adjuster as well as mechanical stability for withstanding vibrations and shock during operation of the vehicle.

FIGS. 2 and 3 illustrate a conventional joining method for a tolerance adjuster having a tang-style fastening system whereby the fastening element is aligned over machined windows from a casting wall surrounding the magnesium-based die casting boss (FIG. 2) and then subsequently inserted into the windows to "snap lock" onto the mounting die cast boss (FIG. 3). However, numerous drawbacks may result from using this existing technology. For example, machining the window openings for the tangs in the die cast boss is difficult because design specifications often call for narrow placement of the window openings in regions where there is little to no buffer (i.e. open) areas surrounding the window opening. Thus, the resulting window openings are brittle and subject to breakage when receiving the fastening element of the tolerance adjuster. In addition, the mounting structures of the magnesium-based die casting have to be outside of the boss area, thus increasing the packaging footprint.

It would be advantageous to provide improved joining methods for fastening tolerance adjusters onto magnesium-based die castings that overcome the foregoing challenges. These and other advantageous features will be apparent to those reviewing the present disclosure.

SUMMARY

An exemplary embodiment relates to an interference fit joining method. The method includes providing a tolerance adjuster and a die casting boss formed in a magnesium-based die casting. The method also includes positioning the tolerance adjuster over a cavity of the die casting boss. The method also includes pressing the tolerance adjuster at least partially into the cavity to form a joint assembly.

Another exemplary embodiment relates to a joint assembly comprising a tolerance adjuster including a base, and a die casting boss including a cavity, wherein the base is held in the cavity of the die casting boss, and wherein an outside diameter of the tolerance adjuster is greater than a diameter of the cavity.

DETAILED DESCRIPTION

The present disclosure describes magnesium-based die castings and joining methods for fastening tolerance adjusters thereon using interference fitting measurements.

A tolerance adjuster is typically designed to bridge distances (i.e. tolerances) between two axially-connected components. The tolerance adjuster needs to be attached to one of these components. In applications where this component is a magnesium die casting, use of the tolerance adjuster can be difficult. For example, some tolerance adjusters are threaded and require relatively large bosses to be formed within the magnesium die casting. These large bosses can make the magnesium die casting undesirable because of porosity issues. Other tolerance adjusters utilize tangs for being received in the magnesium die casting. However, such tolerance adjusters require specialized machining of the magnesium die casting to receive the tangs.

The present disclosure relates to a pressed tolerance adjuster which is partially received within a magnesium-based die casting boss formed in a magnesium-based die casting. An interference fit is formed between the pressed tolerance adjuster and the magnesium-based die casting boss, and a fastener may be utilized to secure a connection between the pressed tolerance adjuster and threads formed in the magnesium-based die casting within the magnesium-based die casting boss.

Figure 1:
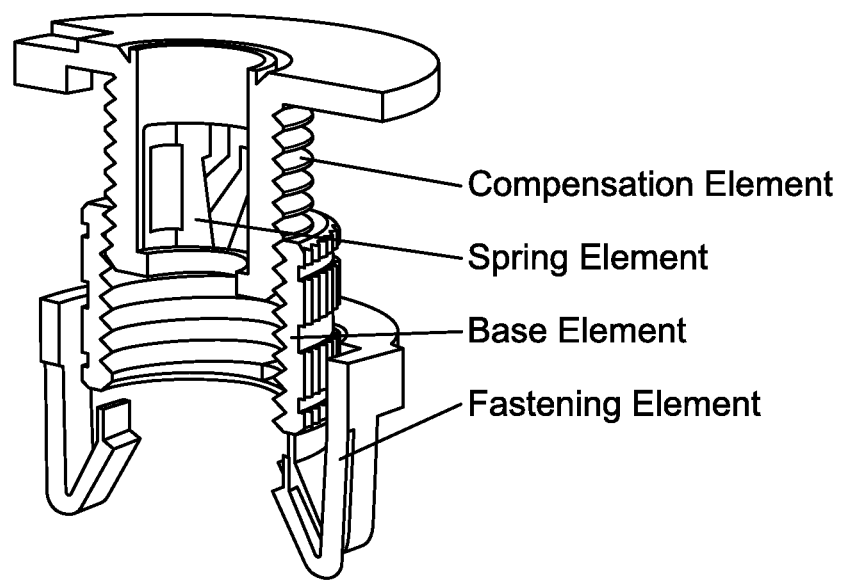
FIG. 1 is a cross-sectional view of a conventional tolerance adjuster.
Figure 2:
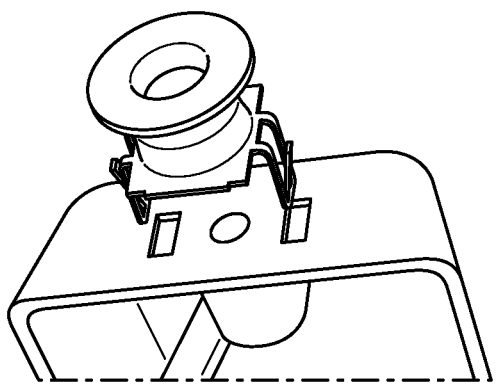
FIGS. 2 and 3 illustrate a conventional joining method for tolerance adjusters having a tang-style fastening system such as that shown in FIG. 1.
Figure 3:
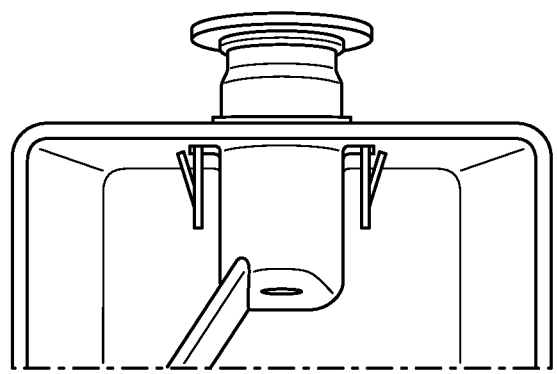
Figure 4:
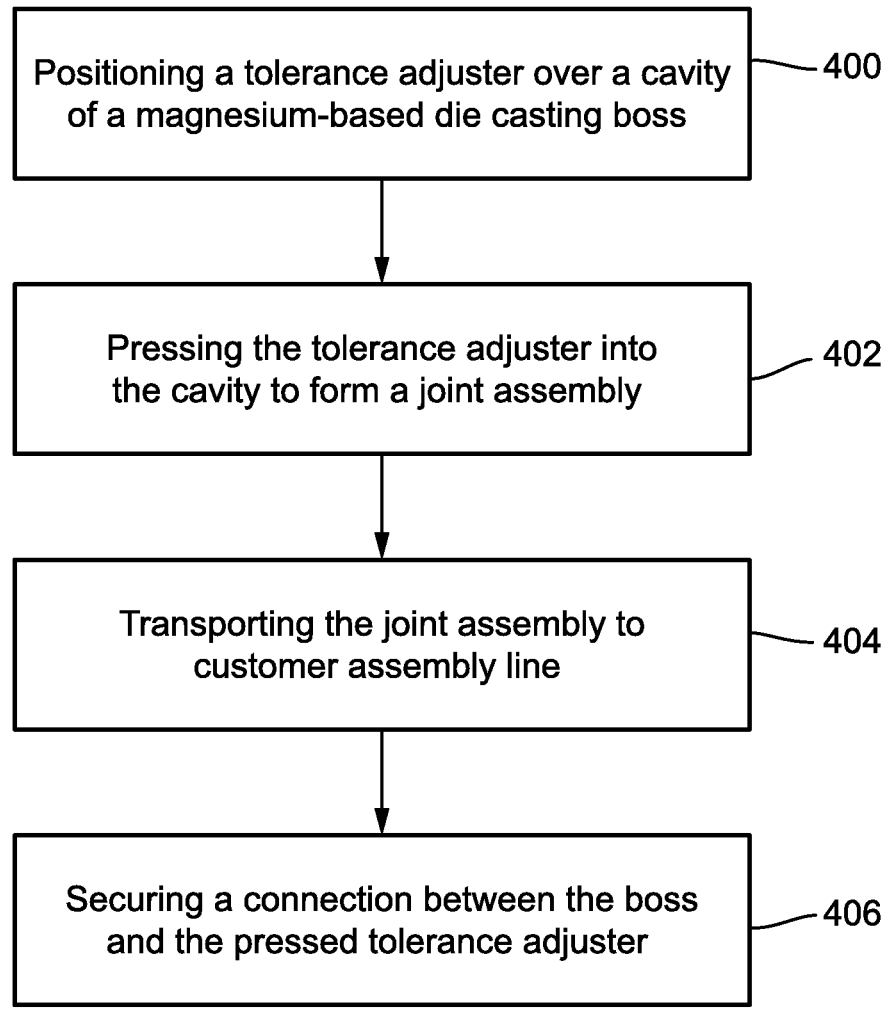
FIG. 4 illustrates an interference fit joining method flow chart according to one embodiment.
Figure 5:
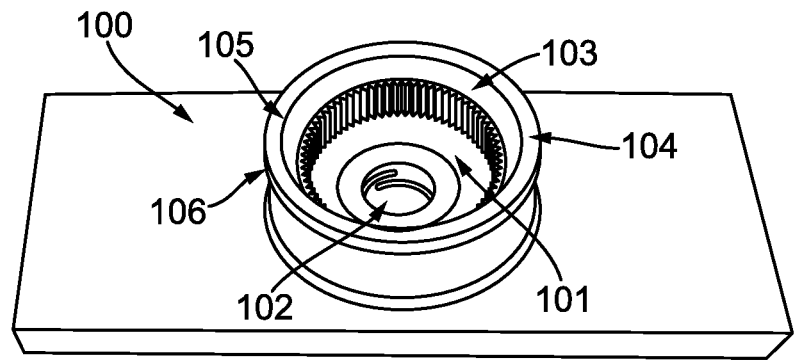
FIG. 5 illustrates a magnesium-based die casting boss according to one embodiment.
Figure 6:
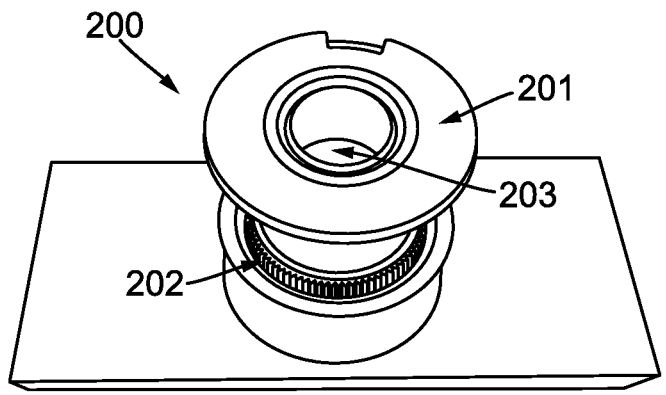
FIG. 6 illustrates a tolerance adjuster received by the magnesium-based die casting boss of FIG. 5 according to one embodiment.

FIG. 4 illustrates an interference fit joining method flow chart according to one embodiment of the present disclosure. FIGS. 5 and 6 illustrate an exemplary magnesium-based die casting boss 100 comprising a magnesium cavity 101 into which is received a tolerance adjuster 200 (i.e. the tolerance adjuster 200 is received within the magnesium cavity 101 of the magnesium-based die casting boss 100).

In a first step of the joining method, the tolerance adjuster 200, which includes an adjuster element 201 and a base 202, is positioned over the magnesium cavity 101 such that a portion of the base 202 sits above an inclined chamfer 103 of the magnesium-based die casting boss 100 and a through-hole 203 is vertically aligned with a threaded hole 102 of the magnesium-based die casting boss 100 (step 400). The inclined chamfer 103 connects the cavity 101 having a vertical sidewall with a topmost horizontal flat surface 104 of the magnesium-based die casting boss 100 (i.e. the inclined chamber 102 is contiguous with the topmost horizontal flat surface 104).

Figure 7:
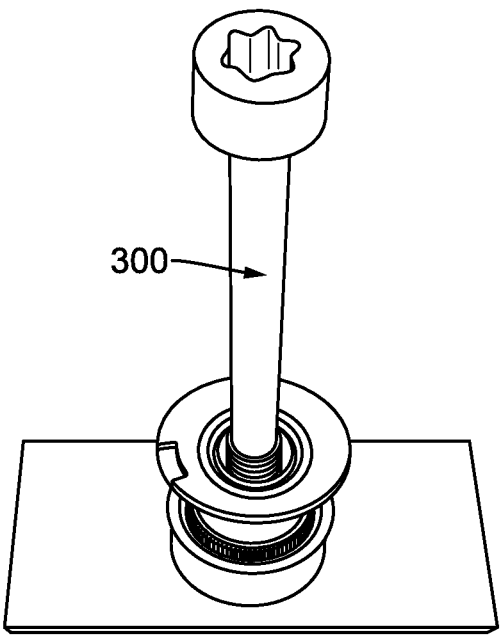
FIG. 7 illustrates a fastener for fastening a tolerance adjuster onto the magnesium-based die casting boss of FIG. 5 according to one embodiment.

In a second step of the joining method (shown in FIG. 6), the tolerance adjuster 200 is firmly pressed into the magnesium cavity 101 of the magnesium-based die casting boss 100 such that the tolerance adjuster 200 is fully received within the magnesium cavity 101 (e.g., a bottom surface of the base 202 contacts a top surface of the magnesium cavity 101, etc.) (step 402). When the tolerance adjuster 200 is fully received within the magnesium cavity 101, the through-hole 203 is aligned with the threaded hole 102. The resulting structure forms a joint assembly. The inclined chamfer 103 is designed to allow for (i.e. facilitate) real-time vertical alignment adjustment of the adjuster 200 during the positioning and pressing steps as well as preventing chips or cracks to the flat surface 104 of the magnesium-based die casting boss 100. Upon completion of the second step, the joint assembly (i.e., magnesium-based die casting boss with the pressed tolerance adjuster) is transported to a customer assembly line for installation as part of automobile component such as headlamps, rear lights, instrument panels, mudguards, door frames, roof ledges, etc. (step 404). Prior to installation of the magnesium-based component in an application, the tolerance adjuster 200 may be utilized to bridge a distance between the magnesium-based component and another component. Specifically, a fastener 300 may be inserted through the through-hole 203 and into threaded hole 102 to secure the connection between the magnesium-based die casting boss 100 and the pressed tolerance adjuster 200 (step 406) (see also FIG. 7). The step of pressing is conducted prior to transporting so that the adjuster 200 does not disassemble from the magnesium-based die casting boss 100.

Figure 8:
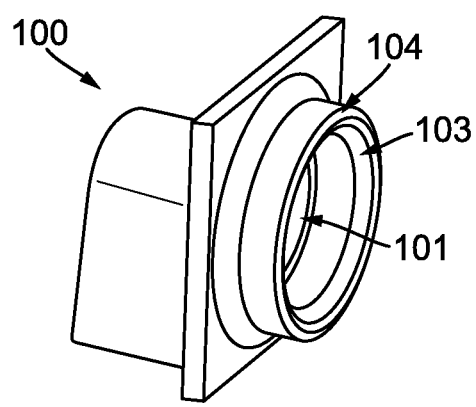
FIG. 8 illustrates a perspective view schematic of a magnesium-based die casting boss according to one embodiment.
Figure 9:
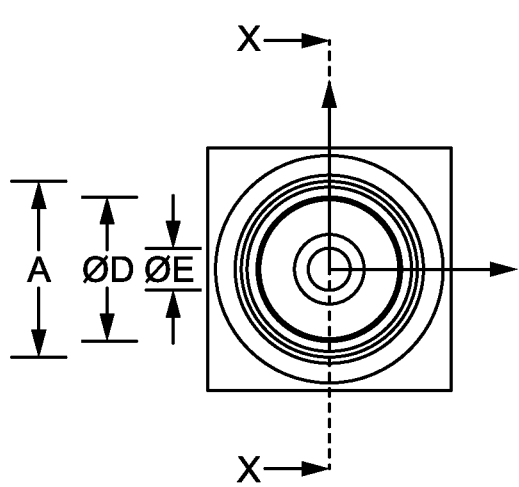
FIGS. 9 and 10 illustrate schematics of a front view and cross-sectional view, respectively, of the magnesium-based die casting boss of FIG. 8 according to one embodiment.
Figure 10:
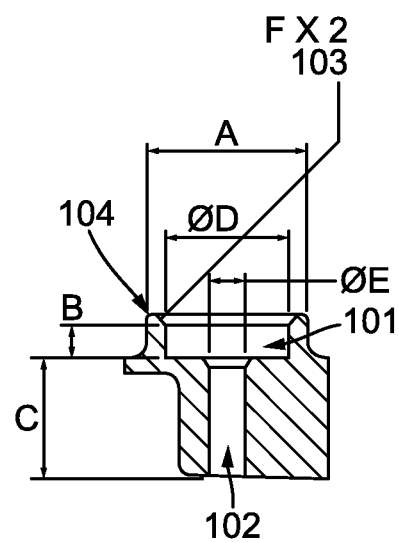

FIG. 8 illustrates a perspective view of a magnesium-based die casting boss while FIGS. 9 and 10 illustrate a front view and cross-sectional view, respectively, of the magnesium-based die casting boss of FIG. 8. Referring to FIGS. 8-10, a magnesium-based die casting boss 100 comprises a magnesium cavity 101 (having a diameter D and a depth B) into which is received a tolerance adjuster. Diameter D dimensions may be chosen in conjunction with the size of the tolerance adjuster and the depth B is selected to ensure the adjuster is securely held in the cavity. Deeper set within the magnesium-based die casting boss 100 is a threaded hole 102 (having a diameter E and depth C) into which the pressed tolerance adjuster is secured to the magnesium-based die casting boss 100. An inclined chamfer 103 having a length F connects the cavity 101 having a vertical sidewall with a topmost horizontal flat surface 104 of the magnesium-based die casting boss 100. As is seen in FIG. 5, the flat surface 104 has an inner edge 105, which shares a boundary with the inclined chamfer 103, and an outer edge 106, which forms an outer boundary of the magnesium-based die casting boss 100 having an outer diameter A. The outer diameter (OD) of the tolerance adjuster (as measured at the base) is engineered to be greater than the diameter D of the cavity 101 such that a press-in-force is required to position the adjuster into the cavity of the boss. The difference between the diameter D of the cavity 101 and the OD of the tolerance adjuster is the interference dimension which must be overcome by the press-in-force in order to position the adjuster in the cavity. Variation of the interference dimension affects the overall effectiveness of the attachment of the tolerance adjuster onto a die casting.

EXEMPLARY EMBODIMENT

In one example of the disclosure provided herein, a tolerance adjuster was joined to a magnesium-based die casting boss through an interference fitting method. In a first step of the fitting method, the tolerance adjuster is positioned over the magnesium cavity. The interference dimension between the adjuster and the cavity is varied from about 0.01 mm to about 0.20 mm. Table 1 below summarizes the various diameters D of the cavity (machined to within ±0.025 mm) that were tested at a constant OD of the tolerance adjuster.

TABLE 1

| | Outside diameter (OD) of the tolerance adjuster (mm) 20.45 | | | | |
|---|---|---|---|---|---|
| Diameter, D, of the cavity (mm) | 20.26 | 20.30 | 20.36 | 20.40 | 20.44 |
| Interference (mm) | 0.19 | 0.15 | 0.09 | 0.05 | 0.01 |

While the present embodiment utilizes a constant OD for the tolerance adjuster, the disclosure should not be limited to such a narrow construction; dimensions of the tolerance adjuster and the cavity may be application dependent. In other embodiments, the OD of the tolerance adjuster may be varied with the diameter D of the cavity being held constant. For example, Table 2 below provides examples of various outside diameters of the adjuster that are also contemplated.

TABLE 2

| Sample ID | Adjuster OD |
|---|---|
| 1 | 20.450 |
| 2 | 20.500 |
| 3 | 20.467 |
| 4 | 20.455 |
| 5 | 20.480 |
| 6 | 20.480 |
| 7 | 20.460 |
| 8 | 20.455 |
| 9 | 20.439 |

Average: 20.465
Standard Deviation: 0.0187
Maximum: 20.500; Minimum: 20.439
Range: 0.061

Figure 11:
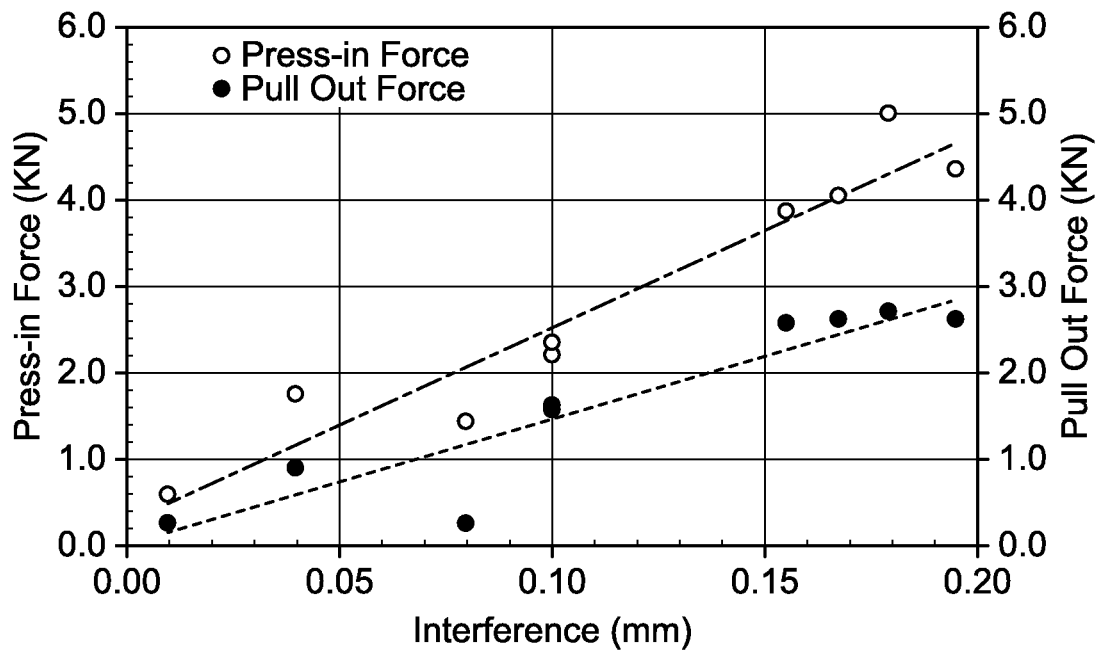
FIG. 11 illustrates the relationship between press-in-force (kN) and pull-out-force (kN) as a function of interference distance (mm).
Figure 12:
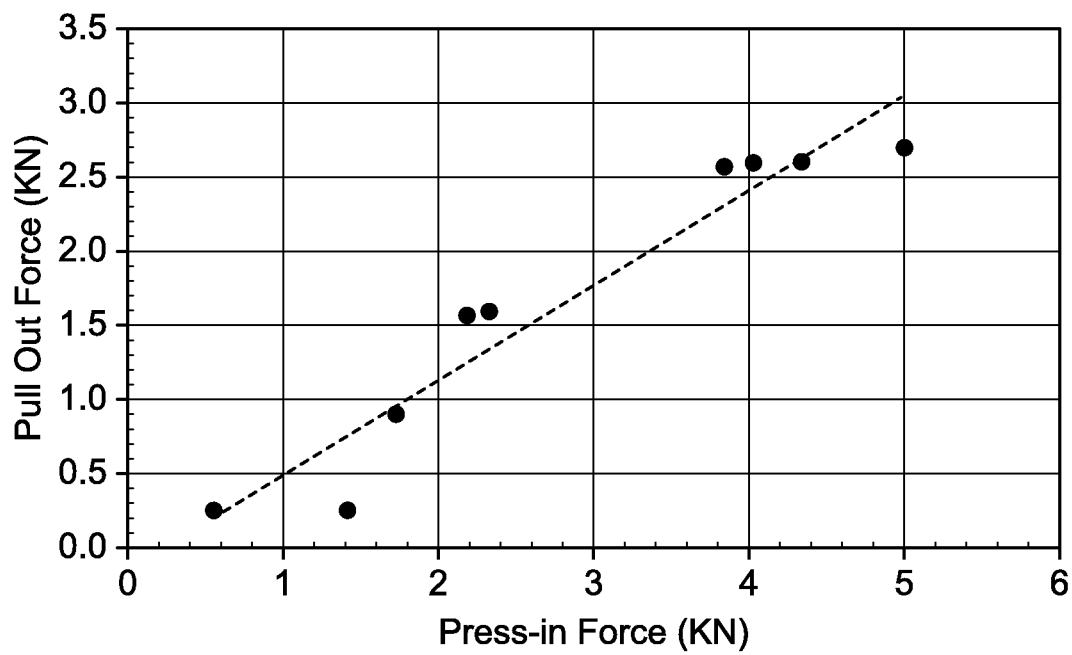
FIG. 12 illustrates the relationship between pull-out-force (kN) as a function of press-in-force (kN).

In a second step of the fitting method, the tolerance adjuster is firmly pressed into the magnesium cavity of the boss until a through-hole of the adjuster is in contact with a threaded hole of the cavity. The press-in-force required to secure a connection with sufficient stability for transportation to the customer assembly line varies with the interference, as is shown in FIG. 11, which illustrates the relationship between press-in-force and pull-out-force as a function of interference distance. At smaller interferences (e.g., less than 0.05 mm), the press-in-force required to secure a connection between the adjuster and cavity and the pull-out-force required to unsecure the connection are below 2.0 kN. As the interference dimension is increased to higher values (up to 0.19 mm) an almost linear relationship is shown with associated press-in- and pull-out-forces. Increased interferences (which may be varied by modifying the OD of the adjuster, or modifying the diameter D of the cavity, or a combination thereof) require a greater press-in-force because the overlap between a vertical edge of the base of the adjuster and the inner edge 105 of the flat surface 104 of the cavity (see FIG. 5) also increases. Likewise, a greater pull-out-force is required with increased interference to counterbalance the elevated press-in-forces, as is shown in FIG. 12, which illustrates the near-linear relationship between pull-out-force as a function of press-in-force.

The interference range needs to be designed with the consideration of both the press-in-force and the pull-out-force. The press-in-force is a measure of the force applied to the magnesium cavity during the press-in stage. If this stress is too high, the magnesium cavity could have a high plastic deformation. If this plastic deformation is too high, the magnesium cavity could crack. In the present experiment, the maximum force that did not result in the magnesium cavity cracking is 4.75 kN. The pull-out-force is a measure of how easily the adjuster will fall out of the cavity during transportation. If this force is too low, the adjuster could fall out of the cavity due to vibration. In the present experiment, the minimum pull-out-force is 300 N. Therefore, the lower end of the interference range (i.e., the smallest interference) should ensure the minimum pull-out-force, while the higher end of the interference range (i.e., the largest interference) should ensure the magnesium won't crack.

Figure 13:
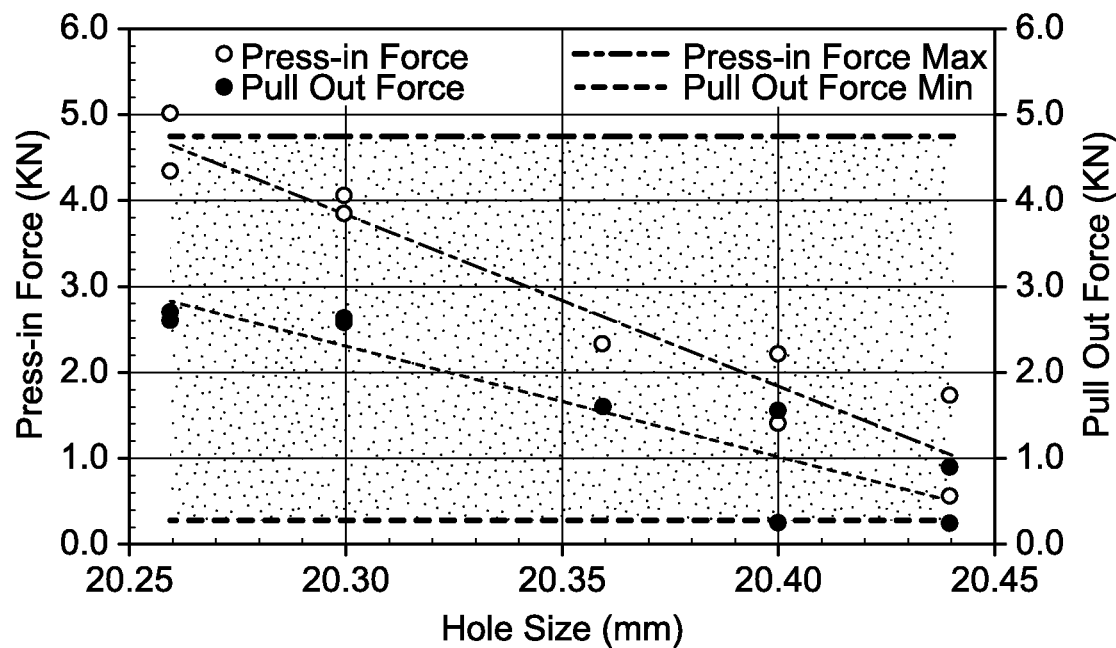
FIG. 13 illustrates the relationship between press-in-force (kN) and pull-out-force (kN) as a function of diameter D (mm) of a cavity of an exemplary magnesium-based die casting boss.
Figure 14:
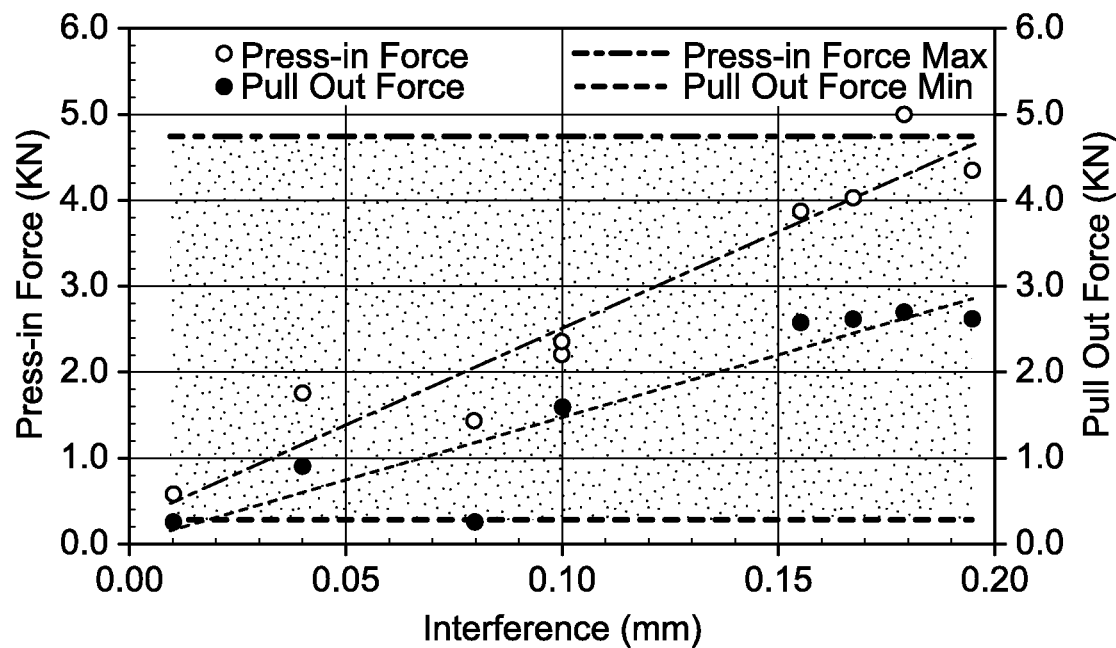
FIG. 14 illustrates the relationship between press-in-force (kN) and pull-out-force (kN) as a function of interference distance (mm).

Referring to FIGS. 13 and 14, the press-in-force and pull-out-force are plotted to determine the window within which the diameter D of the cavity may be machined (for a tolerance adjuster size of 20.45 mm) to achieve interference dimensions sufficient for stable adjuster-cavity joint assemblies. From FIG. 13, it was determined that all of the diameters D of the cavity listed in Table 1 (20.26 mm to 20.44 mm), and therefore interferences in the range of 0.01 mm to 0.19 mm, are sufficient for maintaining structural integrity of the adjuster-cavity joint assembly and ensuring the adjuster remains within the cavity during transportation because no more than a press-in-force of 4.75 kN and at least a pull-out-force of 300 N is used in the second step of the fitting method.

Moreover, the outside diameter of the tolerance adjuster need not be constricted to 20.45 mm. For example, the outside diameters of the adjuster in Table 2 use a maximum size of about 20.500 mm and a minimum size of about 20.439 mm. At each of these ODs (and those that lie within this range), the cavity of the magnesium-based die casting boss may be machined to achieve interferences that fall within the range of 0.01 mm to 0.20 mm (see Table 3 below). With respect to the lower OD of 20.439 mm, the diameter size D of the cavity cannot be 20.44 mm because in that case, the OD of the adjuster would be less than the diameter D of the cavity. With respect to the upper OD of 20.50 mm, the diameter size D of the cavity cannot be 20.26 mm because the resulting interference would exceed 0.20 mm. From the characterizations of FIGS. 13 and 14, it is understood that a maximum press-in-force of 4.75 kN and a minimum pull-out-force of 300 N would safely achieve structural integrity of the adjuster-cavity joint assembly. Thus, the interference fit joining method disclosed herein is feasible for attaching tolerance adjusters onto magnesium-based die casting bosses, even with existing adjusters of various sizes.

TABLE 3

| | Outside diameter (OD) of the tolerance adjuster (mm) | | | | | | | |
|---|---|---|---|---|---|---|---|---|
| | 20.439 | | | | 20.50 | | | |
| Diameter, D, of the cavity (mm) | 20.26 | 20.30 | 20.36 | 20.40 | 20.30 | 20.36 | 20.40 | 20.44 |
| Interference (mm) | 0.18 | 0.14 | 0.08 | 0.04 | 0.20 | 0.14 | 0.10 | 0.06 |

Figure 15:
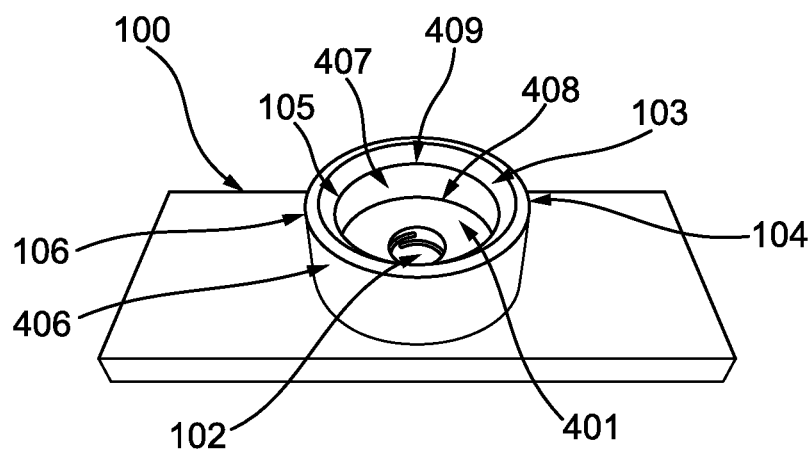
FIG. 15 illustrates a magnesium-based die casting boss, according to another embodiment.
Figure 16:
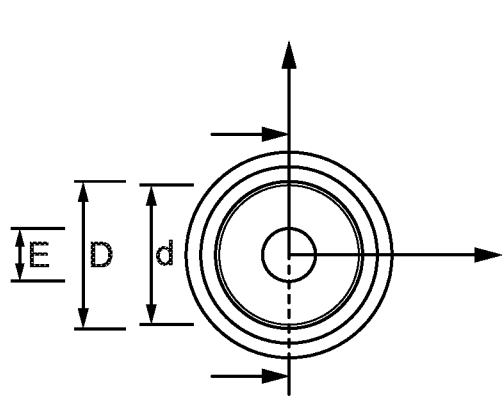
FIGS. 16 and 17 illustrate schematics of a front view and a cross-sectional view, respectively, of the magnesium-based die casting boss of FIG. 15 according to one embodiment.
Figure 17:
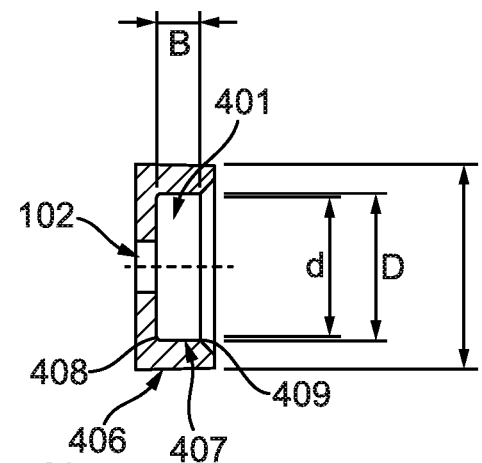

In another embodiment, FIGS. 15-17 illustrate another exemplary magnesium-based die casting boss 100 comprising a magnesium cavity 101 into which is received a tolerance adjuster 200. In particular, the magnesium-based die casting boss 100 of FIGS. 15-17 is substantially similar to the magnesium-based die casting boss 100 of FIGS. 5-10, but instead of an outer surface and vertical sidewall of the cavity 101 being machined, the outer surface 406 and vertical sidewall 407 of cavity 401 of FIGS. 15-17 are as-cast surfaces. Specifically, the outer surface 406 of FIGS. 15-17 is shown to include a 2° draft per side. In other words, a lower edge of the outer surface 406 may have a slightly larger diameter than an upper edge of the outer surface 406 due to the machining process. In addition, the vertical sidewall 407 of the cavity 401 is shown to also include a draft. For example, the vertical sidewall 407 can have a 0.5° draft per side. In other words, a lower edge 408 of the vertical sidewall 407 can have a slightly small diameter (d) than the diameter (D) of an upper edge 409 of the vertical sidewall 407. Beneficially, a magnesium-based die casting boss 100 having draft angles can still receive the tolerance adjuster 200 in same manner as a magnesium-based die casting boss 100 having machined surfaces, but the use of draft angles enable the cavity 401 to be cast out directly, such that machining is not necessary.

FIGS. 16 and 17 illustrate a front view and cross-sectional view, respectively, of an as-cast magnesium-based die casting boss. Referring to FIGS. 16 and 17, an as-cast magnesium-based die casting boss 100 comprises a drafted magnesium cavity 401 (having a depth B) into which is received a tolerance adjuster 200. Deeper set within the magnesium-based die casting boss 100 is a threaded hole 102 (having a diameter E and depth C) into which the pressed tolerance adjuster 200 is secured to the magnesium-based die casting boss 100. An inclined chamfer 103 having a length F connects the cavity 401 having a vertical sidewall 407 with a topmost horizontal flat surface 104 of the magnesium-based die casting boss 100. As described previously with regard to FIG. 5, the flat surface 104 has an inner edge 105, which shares a boundary with the inclined chamfer 103, and an outer edge 106, which forms an outer boundary of the magnesium-based die casting boss 100 having an outer diameter A. The outer edge 106 forms the upper edge of the outer surface 406 of the magnesium-based die casting boss 100. The outer surface 406 of the magnesium-based die casting boss 100 can include a draft angle, such that a lower edge of the outer surface 406 has a larger diameter than the upper edge (i.e., the outer edge 106) of the outer surface 406. For example, the outer surface 406 of the magnesium-based die casting boss 100 can have a draft angle of between 2° per side and 4° per side, inclusive. The vertical sidewall 407 includes a draft angle, such that the lower edge 408 of the vertical sidewall 407 has a smaller diameter than the upper edge 409 of the vertical sidewall 407. For example, the vertical sidewall 407 can have a draft angle of between 0.5° per side and 1° per side, inclusive. The dimensions for diameter d of the lower edge 408 and diameter D of the upper edge 409 may be chosen in conjunction with the size of the tolerance adjuster 200, and the depth B is selected to ensure the tolerance adjuster 200 is securely held in the cavity. The outer diameter (OD) of the tolerance adjuster 200 (as measured at the base) is engineered to be greater than the diameter d of the lower edge 408 of the cavity 401 such that a press-in-force is required to position the tolerance adjuster 200 into the cavity of the magnesium-based die casting boss 100.

In another example of the disclosure provided herein, a tolerance adjuster 200 was joined to a magnesium-based die casting boss 100 through an interference fitting method in the same manner as discussed above. However, here, the magnesium-based die casting boss 100 was machined to include the draft angles on the outer surface 406 and on the vertical sidewall 407 as shown in FIGS. 15-17. Specifically, while the testing was not done on actual as-cast surfaces, the magnesium-based die casting boss 100 did include draft angles that replicate the draft angles of the as-cast magnesium-based die casting boss 100. Table 4 below summarizes the diameter D of the upper edge 409 and diameter d of the lower edge 408 of the cavity 401 of various samples that were tested at a constant OD of the tolerance adjuster.

Figure 18:
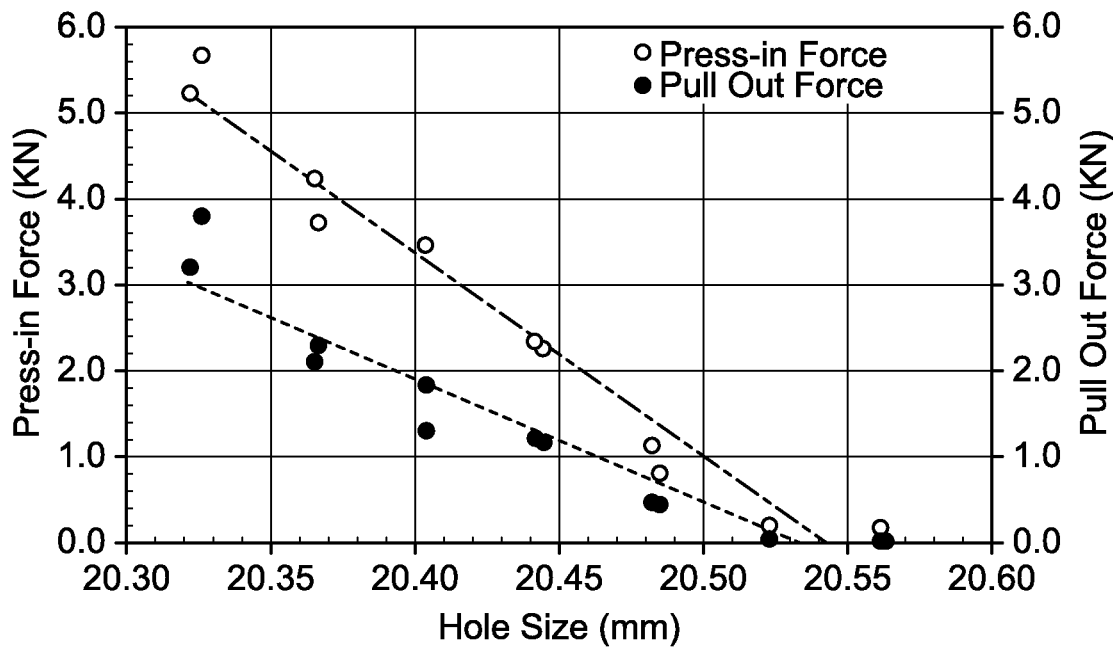
FIG. 18 illustrates the relationship between press-in-force (kN) and pull-out-force (kN) as a function of hole size (mm).
Figure 19:
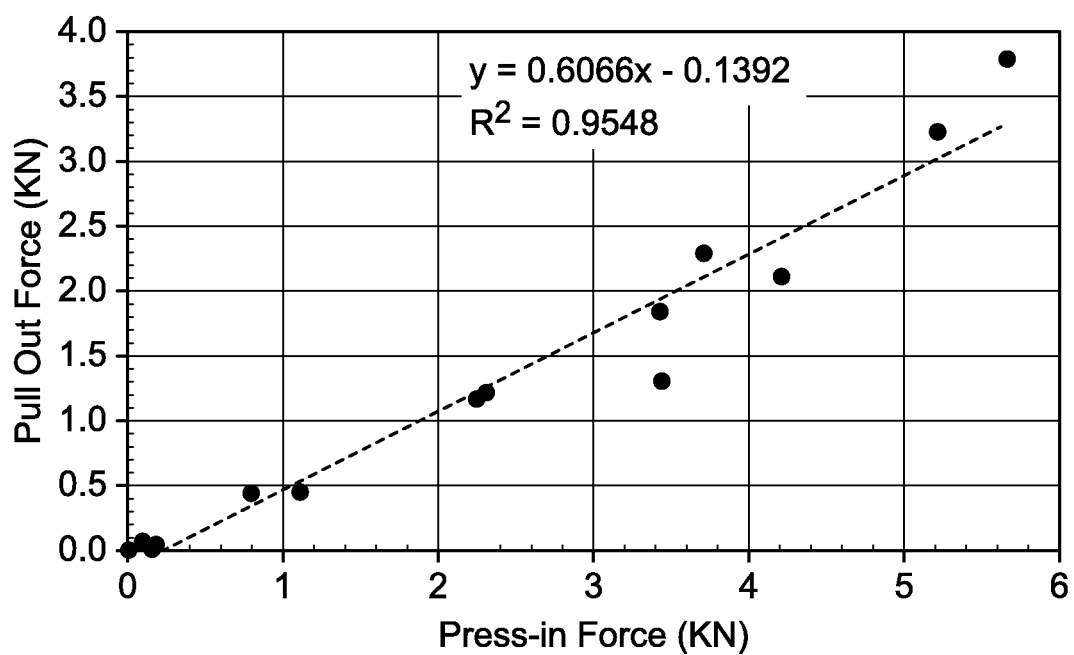
FIG. 19 illustrates the relationship the pull-out-force (kN) as a function of press-in-force (kN).

In a second step of the fitting method, the tolerance adjuster is firmly pressed into the magnesium cavity of the boss until a through-hole of the adjuster is in contact with a threaded hole of the cavity. The press-in-force required to secure a connection with sufficient stability for transportation to the customer assembly line varies with the hole size, as is shown in FIG. 18, which illustrates the relationship between press-in-force and pull-out-force as a function of hole size (i.e., the diameter D of the upper edge 409 of the cavity 401). At larger hole sizes (e.g., greater than 20.485 mm), the press-in-force required to secure a connection between the adjuster and cavity and the pull-out-force required to unsecure the connection are below 2.0 kN. As the hole size dimension is decreased to lower values (down to 20.325 mm) an almost linear relationship is shown with associated press-in- and pull-out-forces. In other words, the press-in force and pull-out force decrease with hole size. Likewise, a greater pull-out-force is required with smaller hole sizes to counterbalance the elevated press-in-forces, as is shown in FIG. 19, which illustrates the near-linear relationship between pull-out-force as a function of press-in-force.

Figure 20:
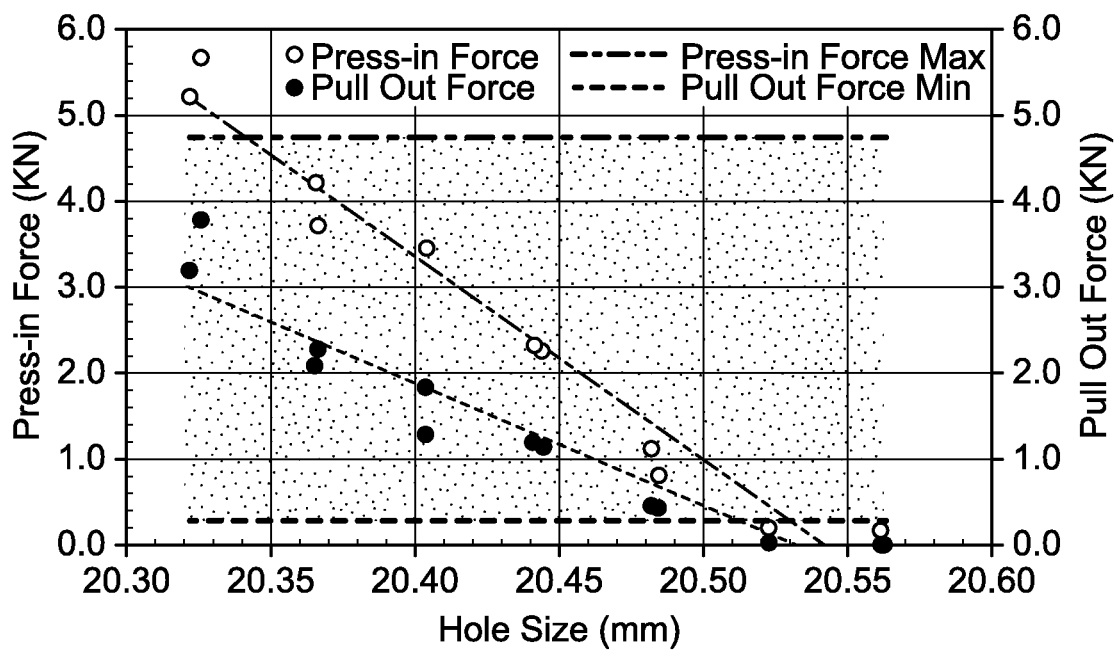
FIG. 20 illustrates the relationship between press-in-force (kN) and pull-out-force (kN) as a function of diameter D (mm) of a cavity of an exemplary magnesium-based die casting boss.

Referring to FIG. 20, the press-in-force and pull-out-force are plotted to determine the window within which the diameter D of the upper edge 409 of the cavity 401 may be dimensioned (for a tolerance adjuster size of 20.45 mm) to achieve interference dimensions sufficient for stable adjuster-cavity joint assemblies. From FIG. 20, it was determined that all but three (i.e., samples 1, 6 and 7, having an upper edge diameter D of 20.325 mm, 20.525 mm and 20.565 mm, respectively) of the diameters D of the cavity listed in Table 4 (20.325 mm to 20.565 mm), are sufficient for maintaining structural integrity of the adjuster-cavity joint assembly and ensuring the adjuster remains within the cavity during transportation because no more than a press-in-force of 4.75 kN and at least a pull-out-force of 300 N is used in the second step of the fitting method. Thus, it has been determined that the draft hole size (i.e., upper edge 409 of the cavity 401) must have a diameter D of 20.43±0.09 mm. While this tolerance is not favorable from a manufacturing perspective, it is, nevertheless, achievable. In other words, the existing adjusters can be attached onto drafted magnesium-based die casting bosses with a narrow but achievable hole size tolerance window. If there is a need to increase the allowable hole size tolerance, some modification to the adjuster knurls may be needed.

In applications where the tolerance adjuster and cavity are of different sizes than disclosed herein, the fitting method of the present disclosure may be similarly applied to either determine the maximum press-in-force and minimum pull-out-force or determine the required cavity diameters and

TABLE 4

| | Sample ID, (n) | | | | | | |
|---|---|---|---|---|---|---|---|
| | 1 | 2 | 3 | 4 | 5 | 6 | 7 |
| Diameter, d, of lower edge 408 of the cavity 401 (mm) | 20.220 | 20.260 | 20.300 | 20.340 | 20.380 | 20.420 | 20.460 |
| Diameter, D, of the upper edge 409 of the cavity 401 (mm) | 20.325 | 20.365 | 20.405 | 20.445 | 20.485 | 20.525 | 20.565 |
| Outside diameter (OD) of the tolerance adjuster (mm) | | | | 20.46 | | | |
| Depth, H, of the cavity (mm) | | | | 6.0 | | | | interferences for maintaining structural integrity of the adjuster-cavity assembly and ensuring an in-tact assembly during transportation.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the magnesium-based die casting boss, tolerance adjuster or the joint assembly as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. In some cases, the actions recited herein can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An interference fit joining method, comprising:
providing a tolerance adjuster and a die casting boss formed in a magnesium-based die casting;
positioning the tolerance adjuster over a cavity of the die casting boss; and
pressing the tolerance adjuster at least partially into the cavity to form a joint assembly.

2. The interference fit joining method of claim 1, wherein the tolerance adjuster and the die casting boss are sized to form an interference fit between the tolerance adjuster and the die casting boss when the tolerance adjuster is at least partially pressed into the cavity.

3. The interference fit joining method of claim 1, wherein pressing the tolerance adjuster into the cavity comprises using a maximum press-in-force of 4.75 kN.

4. The interference fit joining method of claim 3, wherein pressing the tolerance adjuster into the cavity further comprises using a minimum pull-out-force of 300 N.

5. The interference fit joining method of claim 3, wherein an interference dimension between the tolerance adjuster and the cavity is in a range of 0.01 mm to 0.20 mm, inclusive.

6. The interference fit joining method of claim 1, further comprising machining, prior to positioning the tolerance adjuster over the cavity, the die casting boss such that the cavity has a diameter in a range of 20.26 mm to 20.44 mm, inclusive.

7. The interference fit joining method of claim 1, wherein the cavity has a draft angle of 0.5° per side.

8. The interference fit joining method of claim 1, wherein an outer surface of the die casting boss has a draft angle of 2° per side.

9. The interference fit joining method of claim 1, further comprising securing, after pressing the tolerance adjuster into the cavity, a connection between the tolerance adjuster and the die casting boss.

10. The interference fit joining method of claim 9, wherein positioning the tolerance adjuster over the cavity comprises positioning a base of the tolerance adjuster over the cavity such that a through-hole of the tolerance adjuster is vertically aligned with a threaded hole of the die casting boss and such that a portion of the base is positioned at a height above a topmost horizontal flat surface of the die casting boss.

11. The interference fit joining method of claim 10, wherein securing the connection comprises:
   inserting a fastener through the through-hole and into the threaded hole to secure the connection; and
   removing the fastener.

12. A joint assembly, comprising:
   a tolerance adjuster including a base; and
   a die casting boss including a cavity;
   wherein the base is held in the cavity of the die casting boss; and
   wherein an outside diameter of the tolerance adjuster is greater than a diameter of the cavity.

13. The joint assembly of claim 12, wherein the cavity has a diameter in a range of 20.26 mm to 20.44 mm, inclusive.

14. The joint assembly of claim 12, wherein the tolerance adjuster has an outside diameter in a range of 20.439 mm and 20.500 mm, inclusive.

15. The joint assembly of claim 12, wherein the outside diameter of the tolerance adjuster is greater than the diameter of the cavity by an amount in a range of 0.01 mm to 0.20 mm, inclusive.

16. The joint assembly of claim 12, wherein the die casting boss comprises an inclined chamfer connecting a vertical sidewall of the cavity with a topmost horizontal flat surface of the die casting boss.

17. The joint assembly of claim 16, wherein the topmost horizontal flat surface has an inner edge sharing a boundary with the inclined chamfer, and an outer edge which forms an outer boundary of the die casting boss.

18. The joint assembly of claim 12, wherein:
   the tolerance adjuster comprises a through-hole; and
   the die casting boss comprises a threaded hole deeper set into the die casting boss such that when the base is held in the cavity, the through-hole is in contact with the threaded hole.

19. The joint assembly of claim 17, wherein an outer surface of the die casting boss has a 2° draft angle per side.

20. The joint assembly of claim 17, wherein the vertical sidewall of the cavity has a 0.5° draft angle per side.

* * * * *